United States Patent [19]

Stauft

[11] 3,869,755

[45] Mar. 11, 1975

[54] METHOD AND APPARATUS FOR TENDERIZING MEAT

[76] Inventor: Daniel B. Stauft, 5494 Galbraith Rd., Cincinnati, Ohio 45236

[22] Filed: May 23, 1974

[21] Appl. No.: 472,697

Related U.S. Application Data

[63] Continuation-in-part of Ser. No. 303,861, Nov. 6, 1972, abandoned.

[52] U.S. Cl. .................................................. 17/25
[51] Int. Cl............................................... A22b 5/08
[58] Field of Search ............ 30/228, 272 A; 83/620, 83/628; 17/25

[56] References Cited
UNITED STATES PATENTS

2,083,848   6/1957   Berge .................................... 17/25
3,611,746   1/1969   Clifton .................................. 17/25

*Primary Examiner*—Robert Peshock
*Attorney, Agent, or Firm*—Wood, Herron & Evans

[57] ABSTRACT

A housing carrying a blade and a motor mounted in the housing, the motor being connected to the blade to reciprocate the blade with respect to the housing. The blade passes through a foot having a flat surface which engages the surface of meat to guide the blade into the surface of the meat at an angle of approximately 45°. The blade and foot are adapted to be easily disassemlbed for cleaning.

45 Claims, 7 Drawing Figures

METHOD AND APPARATUS FOR TENDERIZING MEAT

This application is a continuation-in-part of application Ser. No. 303,861 which was filed Nov. 6, 1972 and now abandoned.

This invention relates to a method and apparatus for tenderizing meat, and more particularly the invention is directed to the tenderizing of meat by passing a portable reciprocating blade over the surface of the meat, the blade penetrating the meat in increments as it passes over the surface to cut the tough connecting tissue of the meat.

There are in general three approaches to the tenderizing of meat. All have the same general objective of the destruction of tough connecting tissue called fascia. The first is the natural process of aging the meat which requires the meat to be stored for a period of at least 3 weeks to permit the connective tissues to be broken down by natural enzymatic and bacterial action of the constituents of the meat. The aging process improves the tenderness and edibility of the meat but requires time, storage facilities and double handling of the meat. As a practical matter, the inexpensive cuts of meats normally purchased by the average homeowner cannot be aged sufficiently to eliminate the toughness of the connective tissue which causes the meat to be difficult to cut and to eat.

A second approach to the tenderizing of meats involves the use of chemicals. While the chemical tenderizers do in fact tenderize the meat, they are subject to a number of disadvantages. There are many who simply object to the use of chemical additives. The chemical additives tend to impart a distinctive flavor to the meat to which many object. The chemical tenderizers also tend to render the texture of the meat somewhat mushy and, hence, undesirable.

The third approach involves the use of a mechanical tenderizer wherein the connecting tissue is mechanically cut by sharp blades of the tenderizer. The mechanical tissue cutting devices eliminate the disadvantages of the aging process or the chemical process and have a further advantage of tending to decrease the cooking time of the meat and hence result in a cooked meat having a greater retention of the natural juices of the meat than is otherwise possible.

Known mechanical meat tenderizers have their disadvantages. Primarily they are constructed for industrial or institutional use and are constituted by blocks of several hundreds of blades arranged in a pattern with some sort of power associated with the apparatus to drive the blades perpendicularly through the surface of the meat. Such institutional apparatus is far beyond the means of the average homeowner. Further, the pattern of knives, usually arranged in a rectangular block, is often not suitable for coping with the bones in some cuts of meat, thus requiring the meat to be first boned, or alternatively tenderized only in those areas where the meat is spaced a sufficient distance from the bones to avoid the possible engagement of the knives with the bones.

An objective of the present invention has been to provide a portable motor-driven mechanical tenderizer well within the means of the homeowner and capable of improving the tenderizing operation over that of known mechanical tenderizers.

More particularly, the combination of the present invention includes a housing, a reciprocating blade mounted in the housing, the blade projecting through a foot having a planar surface which guides the blade into the meat at an acute angle to the surface of the meat.

In operation of the invention, the operator is simply required to make one or more passes of the portable device over the surface of the meat, guiding the blade directly over a bone if there is such in the meat. Nothing more is required to effect a complete tenderization of the meat, and the resultant meat produced is more completely tenderized than had it been subjected to known mechanical tenderizers.

More specifically, the maintenance of the blade at an acute angle to the meat serves two important functions. First, it causes the device, by imparting to it a horizontal component of motion, to walk along the surface of the meat, thus minimizing the effort required of the operator. Second, it must be understood that the connecting tissue or fashia normally follows the grain of the meat and, hence, extends perpendicularly to the surface of the meat. Therefore, by penetrating the meat at an acute angle to the surface of the meat, there is assurance that the blade will slash through the fashia as the device moves along the surface of the meat.

Another objective of the invention has been to provide a blade for use in the tenderizer device described, the blade being constituted by a plurality of spaced parallel blade elements, the elements having one edge beveled to create a sharp point, adjacent elements being beveled on opposite edges so as to avoid any tendency of the blade to impart lateral thrust to the device. The outside blade elements are preferably wider than the interior elements, thereby imparting additional strength to those elements which must bear the brunt of occasional contact with the bone during the operation of the device.

Another objective of the invention has been to provide a device of the type described in which the foot through which the blade passes may be adjusted to change the distance by which it is spaced from the housing, thereby changing the extent to which the blade projects from the surface of the foot and, hence, its depth of penetration into the meat. Preferably, the blade is adapted to project approximately 1 ¼ inch beyond the foot when the foot is adjusted for maximum blade extension.

Another objective of the invention has been to provide a device of the type described in which the knife is easily removed from the housing and in which the foot is easily disassembled, thereby enabling those elements to be cleaned.

Another objective of the invention has been to provide a single button which cooperates with the foot adjusting mechanism and which cooperates with a blade-locking mechanism so that by manipulation of the single button the depth of penetration can be adjusted and, when desired, the foot and knife can be removed.

Another objective of the invention has been to provide a portable meat tenderizer, the operating parts, including the motor, drive system, and blade being oriented in the housing so that when the device is balanced comfortably in the hand of the user, the cutting blade projects downwardly at an angle of approximately 45°.

These and other objectives of the invention will become more readily apparent from the following detailed description taken in conjunction with the accompanying drawings in which:

FIG. 7 is a cross-sectional view taken along lines 7—7 of FIG. 1 showing the construction of the foot.

Figures 1, 4:
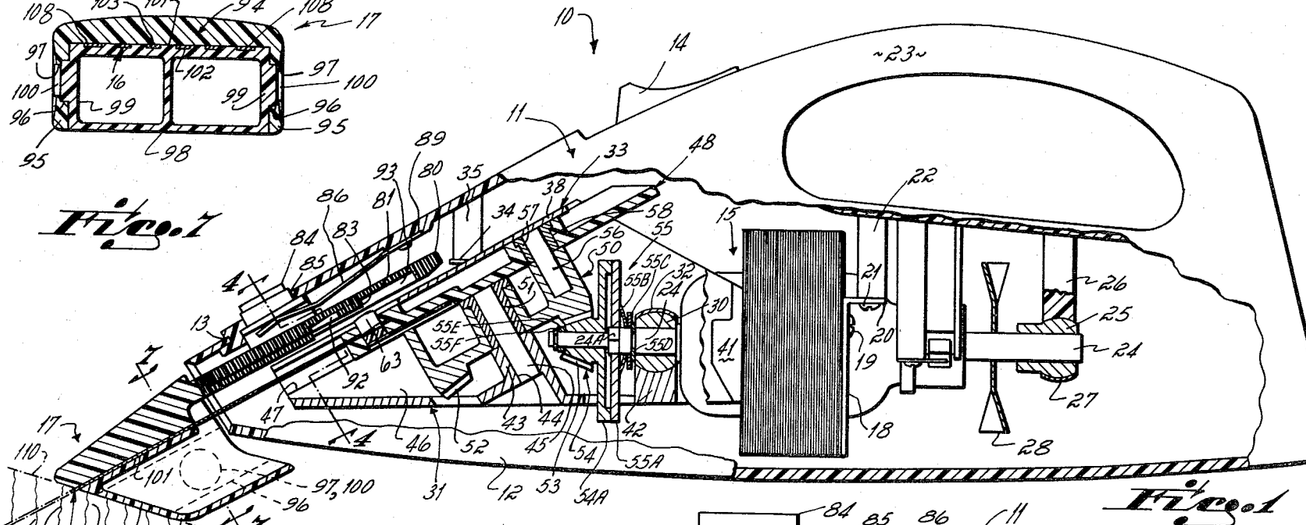
FIG. 1 is an elevational view partly in section showing the tenderizer of the present invention.
FIGS. 4, 5 and 6 are cross-sectional views taken along lines 4—4 of FIG. 1 showing the operation of the foot adjustment and blade release.

Referring to FIG. 1, the tenderizer indicated at 10 has a molded plastic housing 11 closed by a bottom wall 12 which snaps onto the housing as generally indicated at 13. Within the housing is a motor 15 which drives a tenderizing blade 16, the tenderizing blade 16 passing through a foot 17 which projects beyond the front end of the housing. The motor is adapted to be connected to household line voltage through a switch 14 mounted on the housing adjacent a handle 23 molded integrally with the housing.

The motor is secured in the housing by a rear motor mount 18 which is U-shaped and attached at its upper ends by bolts 19 to the motor. The mount has ears 20 which are attached by screws 21 to posts 22 molded integrally with the housing. The motor has a shaft 24 which rotates in a rear bearing 25, the rear bearing being secured to a yoke 26, integral with the housing, by a retainer 27. A fan 28 is mounted integrally with the shaft 24 to cause air to pass over the motor to keep it cool.

Figures 4, 5:
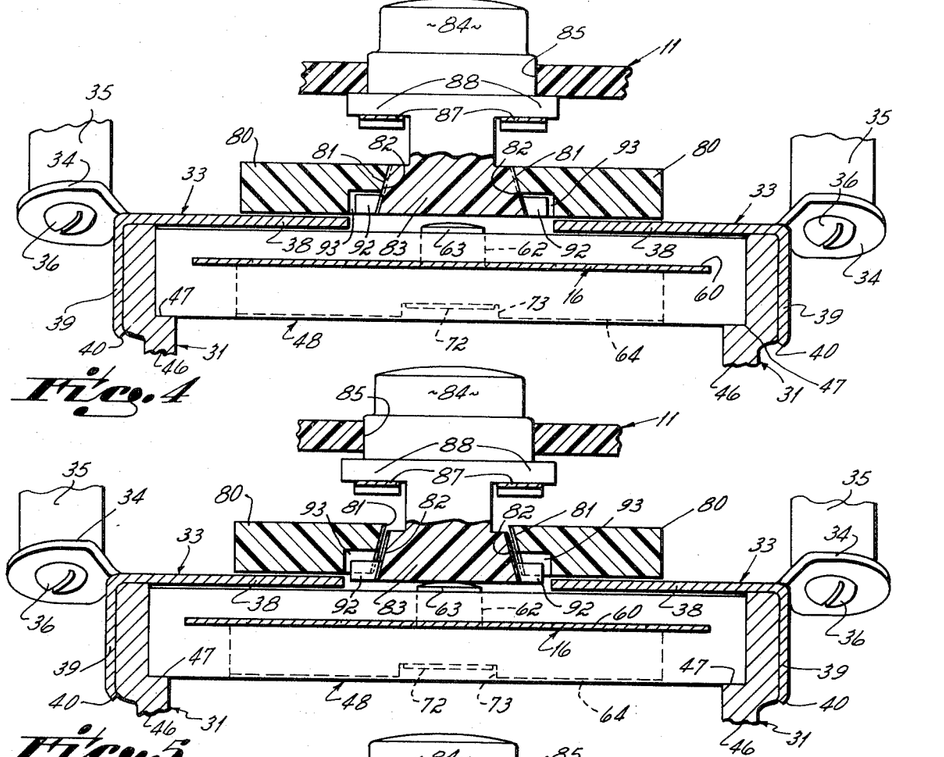
Figure 6:
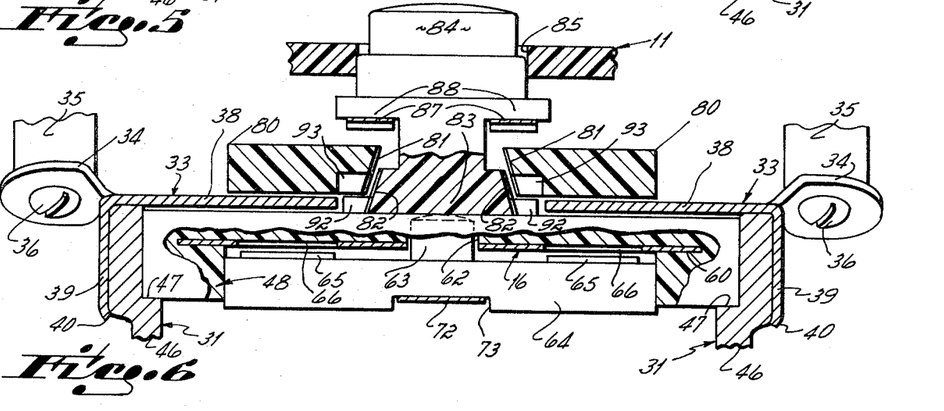

The forward end of the shaft 24 rotates in a bearing 30 which is fixed to a main frame 31 by a retainer 32. The main frame is supported in the housing by a channel-shaped slide retainer 33 which has two ears 34 attached to posts 35 by screws 36 as shown in FIGS. 4–6. The channel-shaped slide retainer has an upper wall 38 and depending side walls 39 which at their lower ends 40 are bent over to embrace and hold the main frame 31.

The main frame 31 is a metal casting having at its rear end a pair of flanges 41 which straddle and position the front end of motor 15. Between flanges 41 is a yoke 42 to which the forward motor bearing 30 is secured. Forward of the yoke 42 is a drive gear support 43 having a bore 44 which receives a gear shaft 45. The main frame 31 has upstanding side walls 46 on both sides of the gear support, the upstanding side walls presenting shoulders 47 (see FIGS. 4–6) on which a slide 48 is mounted for reciprocation and enclosed by the slide retainer 33. The slide carries the blade 16, as will be described below. A gear 50 is rotatably mounted in the main frame, the gear being secured to a bearing 51 which is rotatably mounted on the gear shaft 45. The lower surface of the gear 50 has beveled gear teeth 52 which are in mesh with the beveled gear teeth 53 of a pinion 54 rotatably mounted upon the forward end of the motor shaft 24.

The drive between the drive shaft 24 and the pinion gear 54 includes a slip clutch 55. This clutch 55 functions to disconnect the drive in the event that the blade 16 strikes a bone or an object which would, in the absence of the clutch, cause blade damage or breakage because of the high moment of inertia from the motor armature being transmitted to the blade.

The clutch 55 comprises an annular flange 54a on the rotatably mounted pinion gear 54 and a pressure plate 55a drivingly keyed to a square drive section 24a of the shaft 24. The pressure plate 55a is biased against the annular flange 54a of the pinion gear 54 by a dish spring 55b. This spring is retained on the drive shaft by a backup washer 55c and a snap ring 55d. The pinion 54 is rotatably secured on the drive shaft 24 by a spacer ring 54e and a small snap ring 55f.

The gear 50 carries a drive pin 56 on which an antifriction bushing 57 is rotatably mounted. The bushing rides in a slot 58 (see FIG. 3) in the slide 48 so that as the gear 50 is rotated, the eccentrically mounted pin 56 will cause the slide to reciprocate in the main frame.

Figure 2:
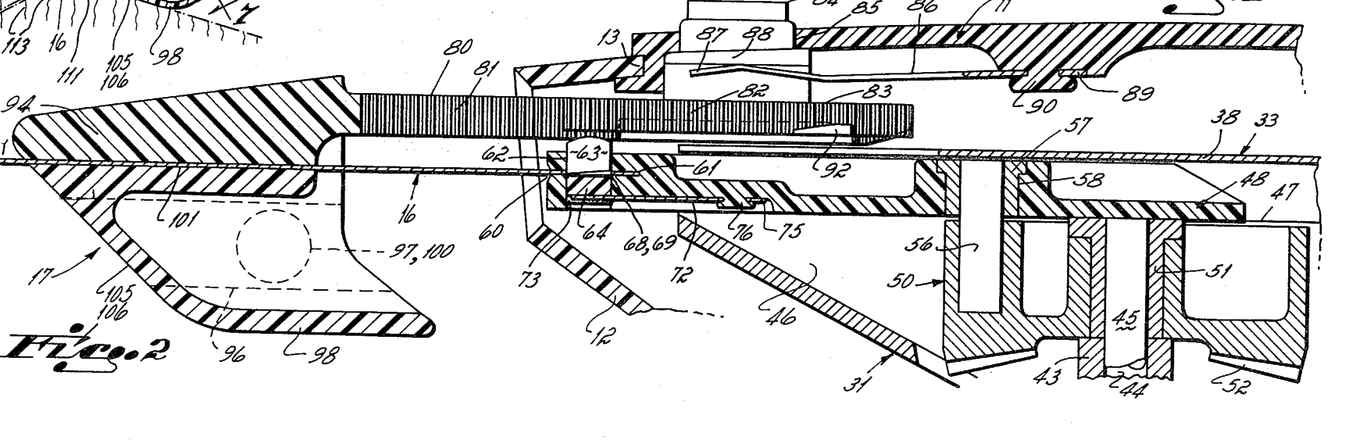
FIG. 2 is an enlarged fragmentary cross-sectional view of the forward end of the device.
Figure 3:
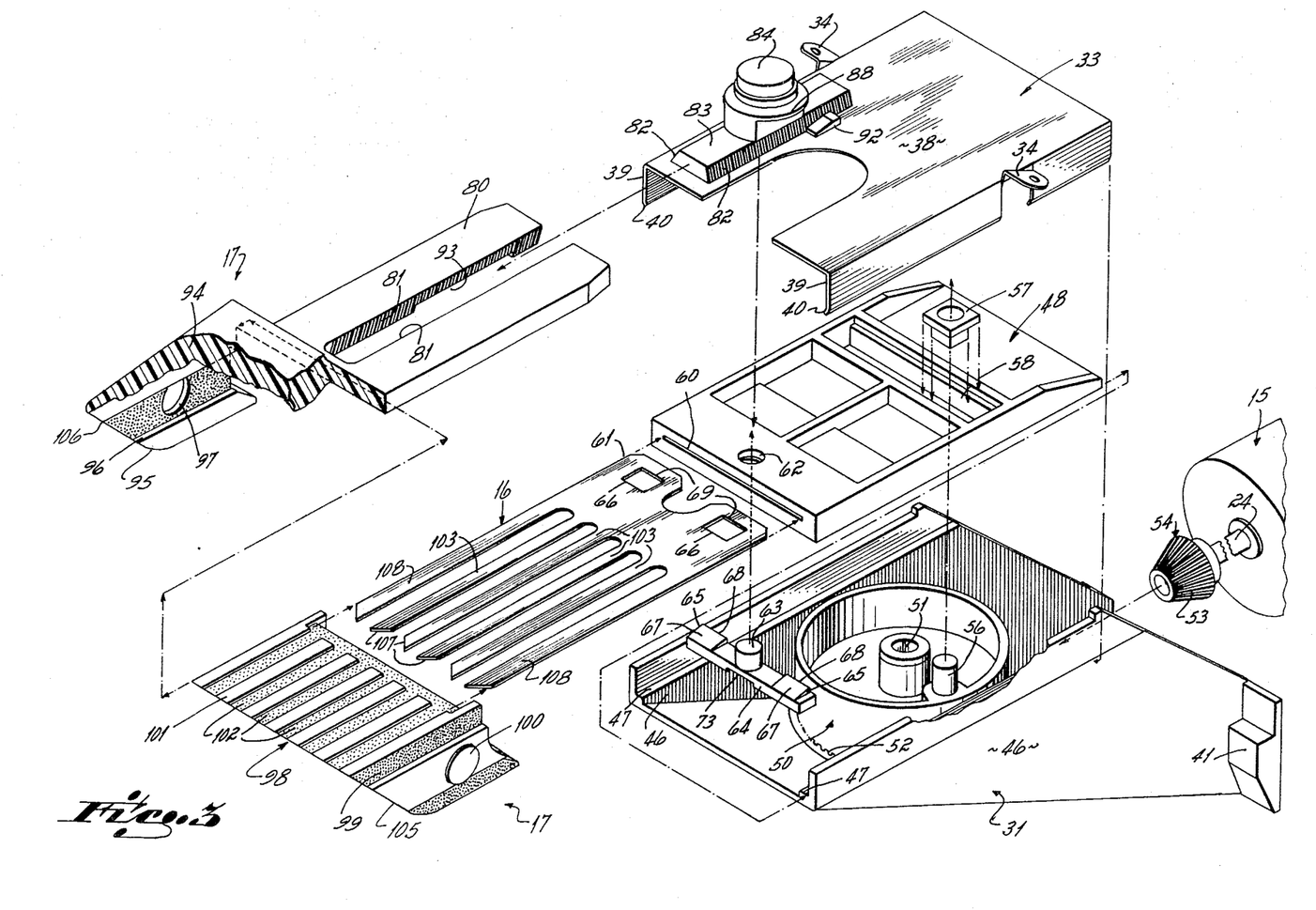
FIG. 3 is a disassembled isometric view illustrating the operative parts of the invention.

The blade 16 is removably mounted at its rearward end to the slide as illustrated in FIGS. 2 and 3. The slide 48 has a slot 60 at its forward end into which the rear end 61 of the blade 16 is removably mounted. The slide has a transverse bore 62 in which a blade-locking button 63 is mounted. The button 63 (as shown in FIG. 3) is integrally molded to a bar 64 having detents 65 on either side. The rearward end of the knife has a pair of rectangular holes 66 which receive the detents 65. Each detent has an upper surface 67 which is inclined to provide a ramp over which the rearward end of the blade rides to introduce the blade into the slot 60. Each detent has a rearward surface 68 which engages a rearward edge 69 of each hole 66. The engagement of the rearward edge 69 of the hole 66 with the surface 68 locks the blade into the slide until the button 63 is depressed to free the surfaces 68, 69 of engagement.

The button 63 is urged in an upward direction by a leaf spring 72 which at its forward end is received in a notch 73 on the bottom of the button bar 64 and the rearward end 75 is swaged to a short post 76 on the slide.

The foot 17 is mounted in the housing for adjustment between a position close to the housing (as shown in FIG. 1) wherein the blade 16 has its maximum projection and a position spaced from the housing (as shown in FIG. 2) wherein the blade has its minimum projection. The foot 17 has a bifurcated stem 80 extending into slots (not shown) in the housing 11 and presenting a pair of opposed surfaces 81 which are serrated and have a downwardly flaring bevel as best illustrated in FIGS. 4–6. The serrated surfaces 81 cooperate with mating beveled and serrated surfaces 82 on an elongated bar 83 which is integral with a foot-retaining button 84. The foot-retaining button projects through an aperture 85 in the top of the housing and is retained in the housing by a spring 86 which urges the button in an outward direction. The spring is bifurcated having two arms 87 which straddle the button and engage a collar 88 on the button. The collar is of greater diameter than the aperture 85, thus limiting the outward movement of the button and forming a surface for engagement by the bifurcated spring 86.

The spring at its rearward end 89 is swaged to a short post 70 of the housing. When the button is in its upwardmost position as urged by the spring 86, the mating bevel surfaces 82 of the bar 83 engage the cooperating serrated surfaces 81 of the stem 80 and hold the stem in that position. The position of the foot can be changed by depressing the foot button 84 slightly to free the engagement of the serrated surfaces 81, 82, thereby permitting the stem to be pulled or pushed longitudinally with respect to the housing until the desired position is achieved. The bar 83 has laterally projecting ears 92 which project into grooves 93 in the stem 80 and provide abutments engageable by the end walls of the groove 93 to define the limits of the adjustment of the foot with respect to the housing.

The bar 83 of the buttom 84 is elongated and overlies the blade-locking button 63 regardless of the position of the blade. Thus, when the foot button 84 is fully depressed, the lower surface of the bar 83 will engage the blade button to depress it and unlock the blade 16 for removal.

The foot per se is formed of two separable parts. One is an upper section 94 having depending side walls 95 terminating in an inwardly directed lip 96. Each side wall has a retaining hole 97. The other part is a sole 98 having stepped side walls 99 from which project cylindrical lugs 100 which project into and which are captured by the holes 97 in the upper section. The sole 98 has an upper surface 101 formed as a series of spaced channels 102 which, when covered by the upper section, form passageways to receive elongated blade elements 103 of the blade 16. The side walls 99 of the sole 98 are resilient and adapted to be easily depressed so as to free the lugs 100 from engagement in holes 97, thereby permitting the foot to be taken apart and cleaned. The sole 98 has a forward inclined surface 105 cooperating with similarly inclined forward edges 106 of the upper section to define a surface for engagement with the meat. The plane of the blade 16 lies at an angle of approximately 45° with the plane of the surfaces 105, 106 so that when the front surface of the foot is in engagement with the meat, the blade is directed into the meat at an angle of approximately 45°. This angle can be varied by the user but preferably should be in the range of 15°–60° during the tenderizing operation.

As indicated, the forward end of the blade is formed as a series of elements whose front edges or cutting edges 107 are beveled to form sharp points for penetration into the meat. Opposite edges of adjacent elements 103 are beveled so as to avoid any lateral thrust caused by the blade penetrating the meat. The two outermost elements 108 are preferably somewhat wider than the remaining inner elements, for the outer elements are those which would normally strike a bone as the user follows the contour of the bone to tenderize the meat and, hence, should be provided with extra strength.

In the operation of the invention, the foot 17 is held against the surface 110 of a cut of meat indicated at 111. Lines 113 in the meat illustrate the orientation of the tough connecting tissue which is to be cut by the tenderizer to effect the tenderizing of the meat. As can be seen in FIG. 1, the blade penetrates the meat at an angle of approximately 45° to its surface and thus cuts through the connecting tissue generally at an angle of 45°.

The operator, holding the handle 23, operates the switch 14 which energizes the motor causing the blade to reciprocate. As the blade reciprocates, it penetrates the meat as indicated and the thrust of penetration tends to move the assembly in a rearward direction so that in simply operating the device, the tenderizer walks along the surface of the meat.

Reciprocation of the blade is caused by rotation of the motor shaft 24 which rotates the pinion 54, thereby rotating gear 50. As the gear 50 rotates, the eccentric pin 56 riding in the slot 58 of the slide 48 causes the slide 48 to reciprocate. The blade, which is secured in the slide by the blade button 63, is carried by the slide in a reciprocatory motion with respect to the housing and foot 17.

In the preferred embodiment, the blade reciprocates at the rate of approximately 2,500 cycles per minute. This rate has been found to be optimal for most cuts of meat, although the tenderizer is effective through a range of approximately 400–4,000 reciprocating strokes per minute. If the blade reciprocates at a rate much less than 400 cycles per minute, it has been found to cause the tenderizer foot to lift off the meat and render it difficult to handle in passage over the meat surface. Alternatively, if the blade reciprocates at a rate in excess of 4,000 cycles per minute, it has been found to be so fast as to partially destroy the texture of the meat.

If the depth of penetration of the blade is to be varied, when the motor 15 is de-energized, the foot button 84 is depressed from its normal position illustrated in FIG. 4 to the position illustrated in FIG. 5. The position of FIG. 5 is short of the full extent of depression permitted by the button 84 but is sufficient to free the mating serrated beveled edges 82 on the elongated bar 83 from the opposed surfaces 81 on the bifurcated stem 80 of the foot. Thus, the foot is free for longitudinal sliding movement within the limits permitted by the engagement of the ears 92 on the button bar with the grooves 93 on the stem of the foot.

After the tenderizing operation, it is desirable to clean the foot and the blade. To do so, the foot 17 is first removed from the housing 11 by depressing button 84 inwardly and sliding the foot 17 forwardly and out of the housing. Then by depressing the buttons 100, the sole 98 may be pushed rearwardly and out of the foot 17. With the foot 17 removed, further depression of the button 84 causes the lower surface of the button bar to engage the blade-locking button 63 and to depress it against the spring 72. Depressing the blade-locking button 63 brings the detents 65 out of engagement with the holes 66 in the blade, thereby permitting the blade to be slid forward and removed from the housing for cleaning. After cleaning, the blade is returned to its normal position simply by sliding it into the slot 60 in the slide 48, the blade riding over the ramp-like surfaces 67 of the detent until it is locked in position. The sole 98 is then snapped into position in the foot 17 and the foot replaced in its slots in the housing 11. The device is then clean and ready for another operation.

While I have described only a single preferred embodiment of my invention, numerous changes and modifications will be readily apparent which incorporate the substance and spirit of my invention.

The configuration of the blade may be varied or the drive train between the motor and the blade may be varied without departing from the spirit of my invention. One variance in the drive train which has been found to be desirable in some instances is the insertion in that drive train of a resilient element to absorb impact or shock loads onto the drive train when the blade impacts with a bone. Other modifications will also be readily apparent to persons skilled in this art. Therefore, I do not intend to be limited except by the scope of the following appended claims.

Having described my invention, I claim:

1. Portable apparatus for tenderizing meat comprising, a housing having a handle,
said housing further having a foot,
said foot having a bottom surface engageable with a surface of the meat to be tenderized,
a motor within said housing,
a knife blade slidably mounted in said housing, said blade having a cutting end projectable from said bottom surface of said foot, said blade being angulated relative to said bottom surface of said foot so that said cutting end of said blade penetrates said surface of the meat at an angle of between approximately 15° to 60° to a vertical plane normal to said surface of the meat as said bottom surface of said foot is moved over said surface of the meat, and
means connecting said motor to said knife blade for reciprocation of said knife blade.

2. Apparatus as in claim 1 in which said blade projects through said foot at an angle of approximately 45° to said surface of the meat.

3. Portable apparatus for tenderizing meat comprising,
a housing having a handle,
said housing further having a foot,
said foot having a bottom surface engageable with a surface of the meat to be tenderized,
a motor within said housing,
a knife blade slideably mounted in said housing, said blade having a cutting end projectable from said bottom surface of said foot, said blade being angulated relative to said bottom surface of said foot so that said cutting end of said blade penetrates said surface of said meat at an angle of between approximately 15° to 60° to a vertical plane normal to said surface of the meat as said bottom surface of said foot is moved over said surface of the meat,
said blade projecting in a generally forward direction to cause said apparatus to be thrust incrementally in a rearward direction as said blade reciprocates, and
means connecting said motor to said knife blade for effecting reciprocation of said knife blade.

4. Portable apparatus for tenderizing meat comprising,
a housing having a handle,
a motor within said housing,
a flat planar knife blade slideably mounted in said housing and having a cutting end projectable from said housing,
means connecting said motor to said knife blade for longitudinal reciprocation of said knife blade,
said blade having a plurality of elongated spaced parallel elements projectable from said housing,
each of said elements being beveled on one side to form a point, said beveled sides having cutting edges thereon, and
adjacent elements of said flat planar knife blade being beveled on opposite sides.

5. Apparatus as in claim 4 in which the outside elements of said flat planar knife blade are beveled on their outside edges and are wider than the inner elements.

6. Portable apparatus for tenderizing meat comprising,
a housing having a handle,
said housing further having a foot,
said foot having a bottom surface engageable with a surface of the meat to be tenderized,
a motor within said housing,
a knife blade slideably mounted in said housing, said blade having a cutting end projectable from said bottom surface of said foot, said blade being angulated relative to said bottom surface of said foot so that said cutting end of said blade penetrates said surface of the meat at an angle of between approximately 15° to 60° to a vertical plane normal to said surface of the meat as said bottom surface of said foot is moved over said surface of the meat,
means connecting said motor to said knife blade for reciprocation of said knife blade, and
means for mounting said foot for longitudinal adjustment in the direction of movement of said blade to adjust the extent of projection of said blade beyond said bottom surface of said foot.

7. Portable apparatus for tenderizing meat comprising,
a housing having a handle,
a motor within said housing,
a knife blade slideably mounted in said housing and having a cutting end projectable from said housing,
means connecting said motor to said knife blade for reciprocation of said knife blade,
a foot mounted on said housing through which said blade projects,
said foot having an upper section and a sole removably mounted on said upper section, said blade passing between said upper section and said sole,
said removable sole adapting said sole, upper section, and blade to be conveniently cleaned after use.

8. Apparatus as in claim 7 in which said upper section includes downwardly depending side walls,
said sole normally being disposed snugly between said side walls,
and cooperating resilient retaining means on said sole and side walls respectively to secure said sole to said upper section.

9. Portable apparatus for tenderizing meat comprising,
a housing having a handle,
a motor within said housing,
a knife blade slideably mounted in said housing and having a cutting end projectable from said housing,
means connecting said motor to said knife blade for reciprocation of said knife blade,
a foot through which said blade passes,
an elongated stem connected to said foot and extending into said housing,
means connecting said stem to said housing for longitudinal adjustment with respect to said housing.

10. Apparatus as in claim 9 in which said stem is bifurcated presenting an elongated slot having serrated, inwardly facing edges,
a foot button mounted in said housing for movement in a direction perpendicular to said stem,
said button having an elongated bar whose side edges are serrated to mate with the serrated edges of said slot,
and a spring urging said latch into engagement with said slot edges to secure said stem in a fixed position in said housing.

11. Apparatus as in claim 10, said serrated edges of said slot being beveled and flaring away from said button,
said latch having a mating bevel on its serrated edges.

12. Apparatus as in claim 1 further comprising, a slide slidably mounted in said housing,
said blade being removably mounted in said slide,
said motor being operatively connected to said slide to reciprocate said slide.

13. Apparatus as in claim 12,
said slide having a transverse slot,
a gear rotatably mounted in said housing adjacent said slide and having an eccentric drive pin engageable with said slot,
said motor having a pinion engaging said gear to rotate said gear when said motor is energized.

14. Portable apparatus for tenderizing meat comprising,
a housing having a handle,
a motor within said housing,
a knife blade slideably mounted in said housing and having a cutting end projectable from said housing,
means connecting said motor to said knife blade for reciprocation of said knife blade,
said connecting means including a slide slideably mounted in said housing,
said blade being removably mounted in said slide,
said motor being operatively connected to said slide to reciprocate said slide,
a blade-locking button mounted in said slide for transverse movement with respect to said slide,
said blade having at least one abutment surface,
said button having at least one detent engageable with said abutment surface to removably lock said blade in said slide.

15. Apparatus as in claim 14,
said blade having two laterally spaced holes at its inner end and said button having two laterally spaced detents normally located in said holes to form said abutment surface and detent, respectively, to lock said blade in said slide.

16. Portable apparatus for tenderizing meat comprising,
a housing having a handle,
a motor within said housing,
a knife blade slideably mounted in said housing and having a cutting end projectable from said housing,
means connecting said motor to said knife blade for reciprocation of said knife blade,
a foot through which said blade passes,
means in said housing for mounting said foot for adjustment toward and away from said housing to vary the extent of the projection of said blade from said foot,
means for releasably locking said blade in said housing,
and a single foot button mounted in said housing and operably associated with said foot-adjusting means and said blade-locking means to permit said foot to be adjusted and removed and said blade to be unlocked upon depressing said foot button.

17. Apparatus as in claim 16 in which said button is integral with a latching bar, said foot being engageable with and selectively positionable with respect to said latching bar to adjust the position of said foot,
said blade-locking means including a spring biased slide button for releasably locking said blade to said means connecting said motor to said blade,
said slide button being engageable with said latching bar to release said blade upon depressing said foot button.

18. Portable apparatus for tenderizing meat comprising,
a housing having a handle,
a motor within said housing,
a knife blade slideably mounted in said housing and having a cutting end projectable from said housing,
means connecting said motor to said knife blade for reciprocation of said knife blade,
a foot at the front of said housing presenting a flat surface engageable with the meat, said blade projecting through said foot at an angle of approximately 45° to said flat surface,
said handle being mounted on the top of said housing rearward of said foot,
said motor being mounted in said housing slightly forward of said handle, the weight of the motor urging said housing to tilt its forward end downwardly when the apparatus is supported by its handle.

19. Apparatus as in claim 1,
said housing having a generally flat bottom wall,
said motor having its axis generally parallel to said bottom wall,
said blade being planar and lying at an acute angle to said bottom wall,
a slide carrying said blade and mounted for reciprocation in a plane parallel to said blade,
a drive gear having an accentric pin connected to said slide and mounted for rotation about an axis perpendicular to the plane of said blade,
and a beveled pinion connecting said motor to said drive gear.

20. Portable apparatus for tenderizing meat comprising,
a housing having a handle,
a motor within said housing,
a knife blade slideably mounted in said housing and having a cutting end projectable from said housing,
means connecting said motor to said knife blade for reciprocation of said knife blade at a speed of at least 400 cycles per minute, and
said means connecting said motor to said knife blade including means for preventing transmission of kinetic energy from said motor to said blade in the event that said blade strikes a solid object.

21. The apparatus of claim 20 in which said last-named means includes a slip coupling.

22. The apparatus of claim 21 in which said slip coupling comprises a friction clutch.

23. The method of tenderizing meat comprising the steps of,
effecting reciprocation of a blade at a rate of between 400 and 4,000 cycles per minute,
hand carrying said reciprocating blade past the surface of said meat,
holding said reciprocating blade so that it penetrates the surface of said meat at an angle of between approximately 15° and 60° to a vertical plane normal to the surface of said meat.

24. In meat tenderizing apparatus a blade comprising,
a flat plate,
means on one end for attaching said plate to said apparatus,
a plurality of flat elongated spaced parallel cutting elements located in a common plane with said flat plate, said cutting elements being located on the other end of said flat plate from said one end, each of said cutting elements having a free end, cutting edges on the free ends of said cutting elements, and the outside cutting elements being wider than the inner elements.

25. A blade as in claim 24 in which one side edge of each element is beveled to form a piercing point on the element, said cutting edges being located on said beveled portions of said cutting elements.

26. A blade as in claim 25 in which opposite side edges of adjacent elements are beveled.

27. A blade as in claim 26 in which the outside edges of the outside elements are beveled.

28. Apparatus as in claim 20 in which said housing has a foot through which said blade projects, said foot having a planar surface engageable with the surface of the meat to be tenderized,
said blade projecting through said foot at an angle of approximately 45° to said planar surface.

29. Apparatus as in claim 28 in which said blade projects in a generally forward direction to cause said apparatus to be thrust incrementally in a rearward direction as said blade reciprocates.

30. Apparatus as in claim 20 in which said blade has a plurality of elongated spaced parallel elements projectable from said housing,
each of said elements being beveled on one side to form a point,
adjacent elements being beveled on opposite sides.

31. Apparatus as in claim 30 in which the outside elements are beveled on their outside edges and are wider than the inner elements.

32. Apparatus as in claim 20 further comprising,
a foot mounted on said housing through which said blade projects,
means for mounting said foot for longitudinal adjustment in the direction of movement of said blade to adjust the extent of projection of said blade beyond said foot.

33. Apparatus as in claim 20 further comprising,
a foot mounted on said housing through which said blade projects,
said foot having an upper section and a sole removably mounted on said upper section, said blade passing between said upper section and said sole,
said removable sole adapting said sole, upper section, and blade to be conveniently cleaned after use.

34. Apparatus as in claim 33 in which said upper section includes downwardly depending side walls,
said sole normally being disposed snugly between said side walls,
and cooperating resilient retaining means on said sole and side walls respectively to secure said sole to said upper section.

35. Apparatus as in claim 20 further comprising,
a foot through which said blade passes,
an elongated stem connected to said foot and extending into said housing,
means connecting said stem to said housing for longitudinal adjustment with respect to said housing.

36. Apparatus as in claim 35 in which said stem is bifurcated presenting an elongated slot having serrated, inwardly facing edges,
a foot button mounted in said housing for movement in a direction perpendicular to said stem,
said button having an elongated bar whose side edges are serrated to mate with the serrated edges of said slot,
and a spring urging said latch into engagement with said slot edges to secure said stem in a fixed position in said housing.

37. Apparatus as in claim 36, said serrated edges of said slot being beveled and flaring away from said button,
said latch having a mating bevel on its serrated edges.

38. Apparatus as in claim 20 further comprising,
a slide slideably mounted in said housing,
said blade being removably mounted in said slide,
said motor being operatively connected to said slide to reciprocate said slide.

39. Apparatus as in claim 38,
said slide having a transverse slot,
a gear rotatably mounted in said housing adjacent said slide and having an eccentric drive pin engageable with said slot,
said motor having a pinion engaging said gear to rotate said gear when said motor is energized.

40. Apparatus as in claim 38 further comprising,
a blade-locking button mounted in said slide for transverse movement with respect to said slide,
said blade having at least one abutment surface,
said button having at least one detent engageable with said abutment surface to removably lock said blade in said slide.

41. Apparatus as in claim 40,
said blade having two laterally spaced holes at its inner end and said button having two laterally spaced detents normally located in said holes to form said abutment surface and detent, respectively, to lock said blade in said slide.

42. Apparatus as in claim 20 further comprising,
a foot through which said blade passes,
means in said housing for mounting said foot for adjustment toward and away from said housing to vary the extent of the projection of said blade from said foot,
means for releasably locking said blade in said housing,
and a single foot button mounted in said housing and operably associated with said foot-adjusting means and said blade-locking means to permit said foot to be adjusted and removed and said blade to be unlocked upon depressing said foot button.

43. Apparatus as in claim 42 in which said button is integral with a latching bar, said foot being engageable with and selectively positionable with respect to said latching bar to adjust the position of said foot,
said blade-locking means including a spring biased slide button for releasably locking said blade to said means connecting said motor to said blade,
said slide button being engageable with said latching bar to release said blade upon depressing said foot button.

44. Apparatus as in claim 20 further comprising a foot at the front of said housing presenting a flat surface engageable with the meat, said blade projecting through said foot at an angle of approximately 45° to said flat surface,
said handle being mounted on the top of said housing rearward of said foot,
said motor being mounted in said housing slightly forward of said handle, the weight of the motor urging said housing to tilt its forward end downwardly when the apparatus is supported by its handle.

45. Apparatus as in claim 20, said housing having a generally flat bottom wall,
said motor having its axis generally parallel to said bottom wall,
said blade being planar and lying at an acute angle to said bottom wall,
a slide carrying said blade and mounted for reciprocation in a plane parallel to said blade,
a drive gear having an eccentric pin connected to said slide and mounted for rotation about an axis perpendicular to the plane of said blade,
and a beveled pinion connecting said motor to said drive gear.

* * * * *